United States Patent [19]
Ebersman et al.

[11] 3,805,152
[45] Apr. 16, 1974

[54] RECIRCULATING TESTING METHODS AND APPARATUS

[75] Inventors: Benjamin Ebersman, Poughkeepsie, N.Y.; John V. Meehan, Vienna, Va.; William T. Wilson, Poughkeepsie, N.Y.

[73] Assignee: International Business Machines Corporation, Armonk, N.Y.

[22] Filed: Aug. 4, 1971

[21] Appl. No.: 168,875

[52] U.S. Cl.......................... 324/73 R, 235/153 AC
[51] Int. Cl........................ G01r 15/12, G06f 11/00
[58] Field of Search...... 324/73, 181, 158 T, 158 D; 328/66, 67; 235/153 AC

[56] References Cited
UNITED STATES PATENTS
3,487,304  12/1969  Kennedy............................... 324/73

OTHER PUBLICATIONS
Williams, M. J. Y.; "Enhanching . . . " Stanford Electronics Labs. Tech. Report No. 4602-1; 9-1970; pg. 1-60.
Merrill, Modified Recirculating Technique, IBM Tech. Disc., Vol. 10, No. 8, 1-68, p. 1125.
Rymaszewski; How to Measure Switching Delay with Picosecond Resolution, E.E.E. 4-66, p. 48.

Primary Examiner—Alfred E. Smith
Assistant Examiner—Ernest F. Karlsen
Attorney, Agent, or Firm—Theodore E. Galanthay

[57] ABSTRACT

Recirculating testing methods and apparatus are employed to perform functional tests on sequential circuits arranged in an array as information storage apparatus. By measuring the propagation times through the apparatus, the AC parameters of the array are determined and the high speed performance of the apparatus ascertained. The information storage apparatus under test is connected in a closed loop with input drive circuitry and delay and decoding circuitry, coupling the output of the apparatus to the input circuitry. A fixed pattern of information is entered into the circuits or storage cells of the apparatus. When predetermined binary signals are applied to the array as well as the output of the apparatus, oscillations occur as a result of the closed loop connection. These oscillations are measured. By sequentially changing the binary signals applied to the array, the entire apparatus is tested.

5 Claims, 4 Drawing Figures

INVENTORS
BENJAMIN EBERSMAN
JOHN V. MEEHAN
WILLIAM T. WILSON

BY John F. Osterndorf
ATTORNEY

RECIRCULATING TESTING METHODS AND APPARATUS

BACKGROUND OF THE INVENTION

1. Field of the Invention

This invention relates to testing methods and apparatus and, more particularly, to the functional testing of sequential circuits arranged in an array such as monolithic information storage apparatus.

2. Description of the Prior Art

In testing monolithic circuitry for use in a computer, the complexity of the circuitry precludes testing of each individual circuit in a particular package, such as a chip or module. Functional testing is therefore performed on the entire package to measure the propagation times of the circuits under speed conditions approximating actual computing machine usage rates.

For combinatorial circuits, it has been suggested that recirculating techniques be employed. One such technique is described in EEE, The Magazine of Circuit Design Engineering, April, 1966, in an article by E. J. Rymaszewski, entitled "How to Measure Switching Delay Times with Picosecond Resolution". In this article, there is described how the output from a combinatorial circuit package is connected back through a delay element as a circuit input. With such a connection and the use of a transmission line inverter, the combinatorial circuit package oscillates so that an odd number of circuit inversions occur. These inversions or oscillations are measured by a frequency counter to provide a direct indication of the turn on and turn off delays of the circuit package and thus of the probable high speed performance of the circuit package.

A modified form of this recirculating technique is described in the IBM Technical Disclosure Bulletin, Volume 10, No. 8, January 1968 at page 1,125. In this system, the need for an external source of test pulses is eliminated by inserting an active element such as single shot multivibrator in the input path to the circuit package under test. The insertion of this circuit sustains the initially started oscillations. However, this arrangement is similarly limited to arrangements of combinatorial circuits.

Such recirculating techniques have not heretofore been applied to sequential circuit arrangements as these types of circuit arrangements are not oscillatory in nature. They do not depend on any one particular set of input conditions for determining a given output but on a complete history of the sets of inputs. It is therefore not possible to predict what the output would be for any one set of inputs and the frequency of change of the arrangement cannot be measured as an indication of turn on and turn off delays.

SUMMARY OF THE INVENTION

When considered with the prior art, this invention extends recirculating testing techniques to arrays of sequential circuits such as those used in configurations of information storage apparatus. The particular memory package is functionally tested for AC parameters by measuring the propagation time through the package. These parameters include the access time to the array, the cycle time for the array, and the times required for operation of the read and write control and clocking circuitry.

According to the method and apparatus of the invention, a memory array under test is connected in a closed loop system with data controls, delay means and decoding circuitry. Drive circuitry and the output of the decoding circuitry are selectively coupled to the memory array through a switching network operable under test program control. A frequency counter coupled to the output of the apparatus monitors the oscillations of the apparatus and, thus, its probable high speed performance.

For a given set of input conditions, the apparatus is made to simulate and operate as a combinatorial circuit package. The individual storage circuits or cells of the array remain in a fixed state of storage, that is, a predetermined binary information storage pattern is loaded into the cells. By changing the input conditions using the output from the decoding circuitry, selection of alternate cells is performed and oscillations occur to provide a test indication for the array. During the performance of any one test, the predetermined pattern in the cells is not altered.

By employing the decoding circuitry, a predetermined path for testing is established making the array of sequential circuits appear as a combinatorial circuit package. The switching pattern for the array is thus determined by the decoding circuitry in conjunction with the drive circuitry. Both of these circuits act through the switching network on the storage apparatus.

DESCRIPTION OF THE PREFERRED EMBODIMENTS

Figure 1:
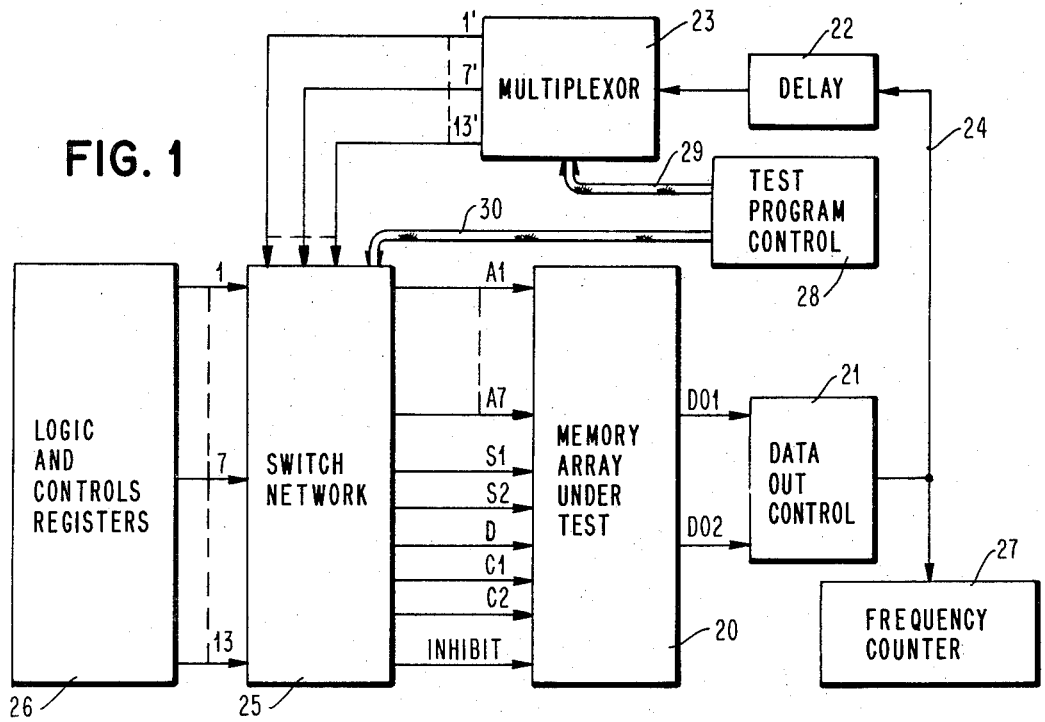
FIG. 1 is a block diagram of the apparatus for testing a memory array.

Referring now to FIG. 1, information storage apparatus, such as a memory array under test, is indicated at 20. Array 20 is provided with binary addressing input signals A1-A7 as well as input signals S1, S2, C1, C2, D and Inhibit. All of these input signals, as well as the particular circuitry of array 20, are described with greater particularly hereinafter. Array 20 also provides two output signals indicated as DO1 and DO2 to data out control circuit 21. The output signals DO1 and DO2 are the complement of one another. Both of these output signals are also binary signals. Control circuit 21 selectively connects one of these outputs to a recirculating loop including some of the test apparatus.

The loop includes a delay element 22 and decoding circuitry which operates as a multiplexor 23. Element 22 and multiplexor 23 are connected in a feedback circuit 24 to a switching network 25. Switching network 25 accepts the output signals 1'-13' from multiplexor 23 as well as the signals 1-13 from logic and controls registers 26. Network 25 provides the input signal levels to array 20 under test. The circuitry in registers 26 may be any suitable well known drive circuitry providing bi-level signals. These are binary logic inputs as well as control signals to select the particular cells in array 20.

Delay element 22 in feedback path 24 may be a transmission line inverter to assure the level at data out control 21 is changed when applied to the selected input determined by multiplexor 23. By alternately changing the levels, memory array 20 is caused to oscillate. These oscillations are frequency counted at 27 to provide an indication of the turn on and turn off times for array 20.

Multiplexor 23, which may be a coaxial relay tree, operates as a decoding circuit accepting the delayed output from element 22 and selecting a suitable one of the output lines 1'–13'. The selection of the particular output line from multiplexor 23 causes the testing to be performed in array 20 along a predetermined path.

The selected line is determined by test program control circuitry 28 which may be a general purpose digital computer having a stored test program. Circuitry 28 is coupled by cables 29 and 30 to multiplexor 23 and switch network 25. When the line is changed, the memory cell in array 20 that is to be tested is similarly changed.

The frequency of oscillation as measured in frequency counter 27 is $f_{osc} = 1/2(t_d + t_{ckt})$ where $t_d$ is the total delay of delay element 22 and $t_{ckt} = t_{on} + t_{off}/2$. The value of $t_{ckt}$ refers to the turn on and turn off time for the selected cell under test. As the external delay, that is the delay of delay element 22, is readily known, the delay of the circuit can be determined from the frequency of oscillation measured by frequency counter 27 for a predetermined period of time.

Figure 2:
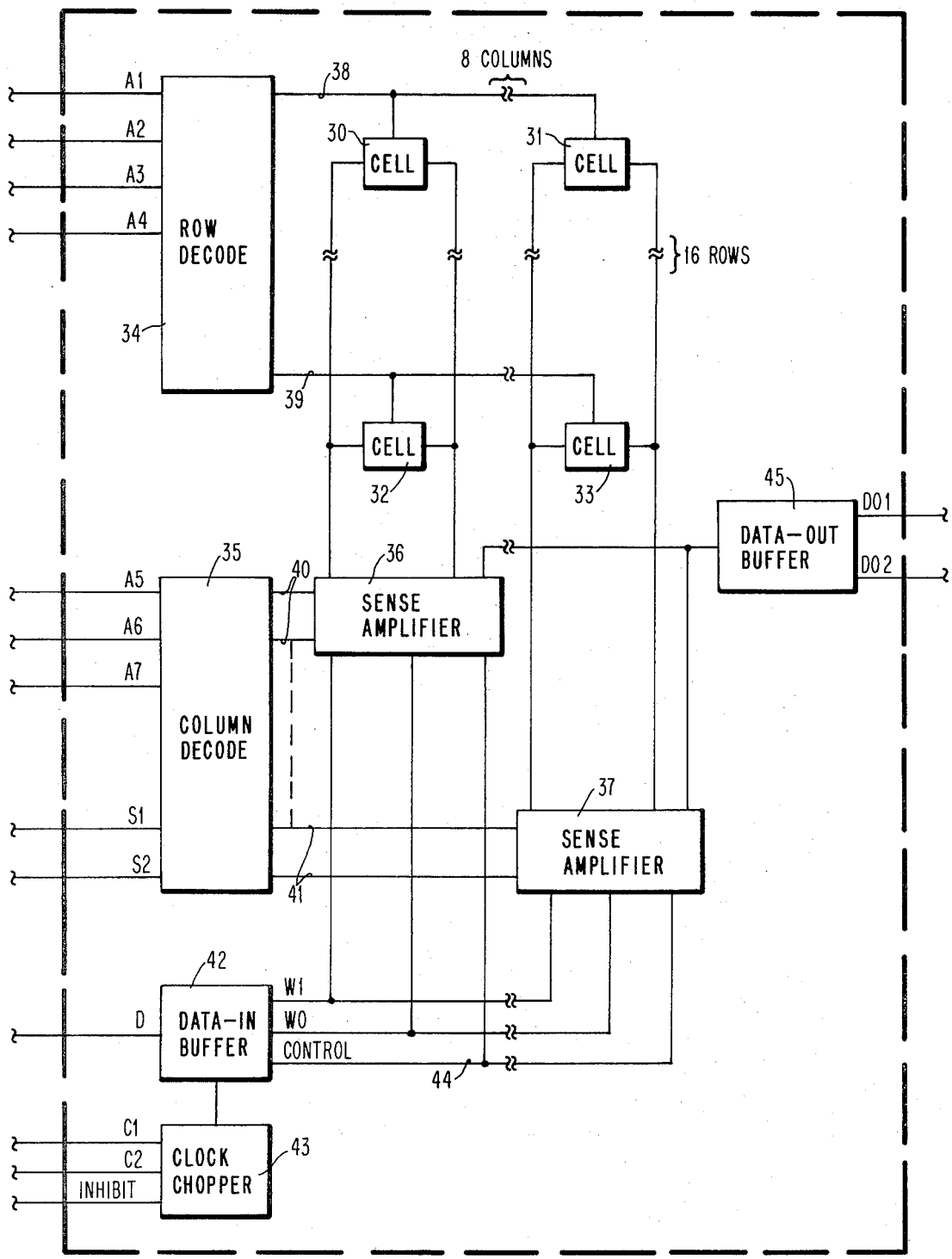
FIG. 2 is a block diagram of a typical memory array package that is to be tested.

An illustrative memory array that is to be tested is depicted in FIG. 2. The array comprises a plurality of individual sequential circuits or storage cells arranged in a matrix of columns and rows. The cells are indicated at 30, 31, 32, 33. For this particular array, it is assumed that the cells may be arranged in eight columns and sixteen rows providing 128 cells, each of which is capable of storing one binary bit of information.

For addressing a particular row of the array, row decode circuitry 34 is provided and for addressing a particular column of the array, column decode circuitry 35 is provided. Four of the address inputs to the array, A1–A4, are coupled to row decode circuitry 34 and the remaining three address lines, A5–A7, are coupled to the column decode circuitry 35. A sense amplifier 36, 37 is provided for each column of the array.

Addressing of the rows of the array is directly accomplished through connections such as 38, 39, whereas addressing of the columns of the array is provided through the sense amplifiers 36, 37 by connections 40, 41. The S1 and S2 inputs are chip select addressing lines and are coupled to column decode circuitry 35.

Determination of the mode of operation of the array, that is a read mode, write mode or inhibit, is accomplished through a data in buffer circuit 42 which is coupled to accept the output from a clock chopper 43 and the data in line D. The clock chopper 43 receives the C1, C2 and inhibit inputs. Writing in of data is performed on the W1 and W0 lines coupled to sense amplifiers 36, 37 and determination of the mode of operation is performed via control line 44 which is also coupled to sense amplifiers 36 and 37. When control line 44 is in the read mode, data is read from the addressed cells to data output buffer 45 which provides the DO1 and DO2 outputs in FIG. 1.

It is to be understood that the memory array of FIG. 2 is described merely by way of illustration as one array that may be tested using the method and apparatus of this invention. The specific circuit arrangements of this array are described in copending Application Ser. No. 85,536 filed Oct. 30, 1970 in the name of Andrew R. Berding and assigned to the same assignee as this invention. Reference may be had to this application for a complete description of this memory array and its modes of operation.

As previously stated, the method and apparatus of the invention involve the conversion of an effectively sequential logic circuit arrangement to a combinatorial logic circuit arrangement. All circuit elements of the array are capable of being included in recirculating paths and are thus testable. The tests are performed by determining the average delay times through various selected paths of the arrangement using counting apparatus for measuring the oscillations occurring in response to each set of applied conditions.

The method of the invention involves the presetting of the cells 30–33 of the memory array 20 to known binary storage values. Using the data in line D under control of the C1 and C2 lines, these values are written into the cells by the W1 and W0 connections. A particular pattern could provide for adjacent cells to alternate between binary "1s" and binary "0's". Thus, cells 30 and 33 would have a "1" stored in them and cells 31 and 32 would have a "0" stored in them. These values are not altered during each test. In effect, each cell of the array 20 has a single state for each test and therefore does not operate as a sequential circuit.

The testing involves the selection of a particular path through the array using multiplexor 23 and switching network 25. Multiplexor 23 selects one of the lines 1'–13' for connection to switching network 25 which couples binary signal levels on the remaining lines 1–13 to array 20 under test. By applying predetermined binary levels to the various ones of the inputs A1–A7, S1, S2, D, C1, C2, and inhibit, the delays through cells 30–33, decode circuitry 34, 35, selection circuitry in decode circuitry 35, data in controls 42, 43 and data output controls 45, testing of the signal paths is accomplished. Testing is done on the addressing lines, writing controls and select lines by reading of the data out.

Figure 3A:
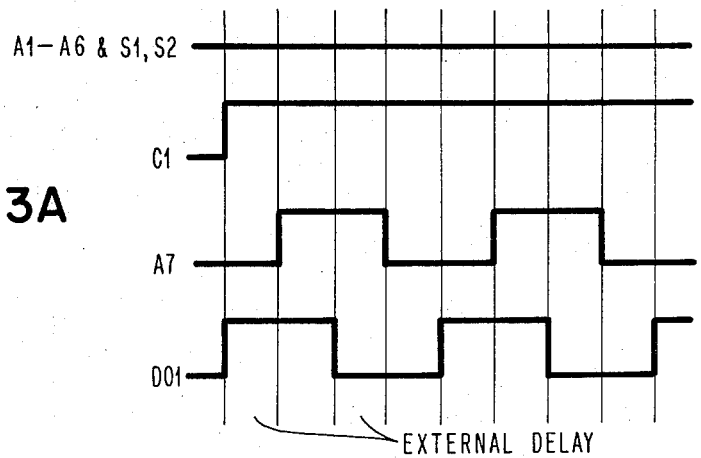
FIGS. 3A and 3B are timing diagrams showing the operation of the testing apparatus of FIG. 1.

In the first of these groups of tests, that is the addressing and reading of data, cells 30–33 of array 20 have been preloaded with binary information. Each adjacent cell alternates in its binary content. In performing the test, the addressing circuitry line C1 is set to an upper level (as shown in FIG. 3a) to inhibit all write functions and lines S1–S2 are set to a lower level to select the chip. Output line DO1 is coupled via feedback connection 24 to multiplexor 23. Under the control of the test program control circuits 28, multiplexor 23 decodes the feedback connection to multiplexor output 7'. Using switching network 25, the address lines A1-A6 are connected to a lower value. C2, D and inhibit lines may be set at either value. The feedback connection is only made to a selected address line, which in this example is A7. As the A7 input signal changes from a binary "1" to binary "0", alternate cells of the array are addressed and read. Since the preloaded pattern of information in these cells also alternates, the output signal level provided also alternates between binary "1's" and "0's".

This output signal level provided at DO1 oscillates at a frequency dependent on the delays of the array through the address decode circuitry 34, 35, sense amplifiers 36, 37 and data output buffer 45. In addition, the delay of the external feedback circuit including the delay element 22 is included in the total delay. Thus, the total delay is equal to the delay of the array under test plus the external circuit delay. The reciprocal of twice this total delay equals the frequency of oscillation that is measured in frequency counter 27. As the external circuit delay is known, the delay of the circuit under test which is equal to the turn on time plus the turn off time divided by two is readily ascertainable.

One by one the various combinations of address lines A1–A7 are selected until all cells have been accessed. With each addressing, two different cells of the array are alternately accessed and measured in the read operation. Every single cell in the array can thus be measured in terms of its frequency of switching between it and its mating cell.

It is also within the purview of the method of the invention to reverse the alternating preloaded storage pattern in the cells so that every cell storing a binary "1" is changed to store a binary "0" and, correspondingly, every cell that stored a binary "0" is made to store a binary "1". The complement of the output is then taken at the DO2 output and coupled back through feedback path 24 to delay element 22 which also acts to invert this signal and apply it back as a decoded input.

Figure 3B:
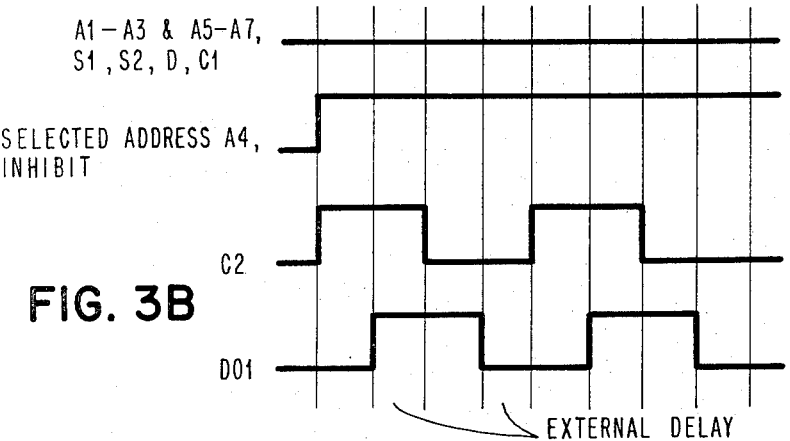

To test the writing control circuits and reading of data, again a predetermined pattern of information is stored in the cells of array 20. Any of the address lines A1–A7 is selected but the particular cell chosen for testing is required to contain a binary "1" as the information stored. As shown in FIG. 3b, select lines S1 and S2 are placed at a lower binary level to select the chip. D line is set at a lower binary level so as to write a binary "1" into the selected cell. Inhibit line is set to an upper binary level inhibiting the clock chopper 43. C1 line is set at a lower binary level to enable the write function and one of the data out lines DO1 or DO2 is connected by data output control circuitry 21 to feedback path 24 for coupling, using multiplexor 23 and switching network 25 which connects the output into the C2 input. This series of connections causes array 20 to oscillate alternately, operating between the read and write modes. The frequency of oscillation measured at frequency counter 27 is then a function of the clock delay as well as the delays of data in buffer circuitry 42, sense amplifiers 36, 37 and data out buffer delays 45.

In this mode of operation when the selected output DO1 or DO2 rises to an upper binary level, input C2 drops to a lower binary level after the delay in feedback path 24, causing a binary "1" to be written into the addressed cell. As this cell is already storing a binary "1", it is unchanged but the output is forced to a binary "0" as the circuitry is now in the write mode of operation. Whenever the array is in the write mode of operation, the output is placed at a binary "0" level. Again, after a delay, this binary "0" is inverted to a binary "1". The array is placed in the read state and as there is a binary "1" stored in the selected cell, the output will be a binary "1". Repeating this process causes the oscillations to occur which is measured at frequency counter 27.

To determine the speed of the chip select lines, that is, to test the select line timing by the reading of data, the multiplexor 23 decodes the input from the feedback path 24 and provides it through switching network 25 to one of the select lines S1, S2. The address lines A1–A7 are coupled through switching network 25 to logic and control registers 26 such that the selected cell is storing a binary "1". The write circuitry is inhibited by placing C1 at a binary "1" level and the C2, D and Inhibit lines are set at either level. The non-selected line (for example, S2) must be set at a binary "0".

When the output signal is provided by data out buffer 45, it is at a binary "1" level corresponding to the level stored in the selected cell. This signal after being coupled through feedback path 24 and onto the chip select line (for example, S1) causes the chip to be unselected so that the output level drops to a binary "0" level after the delays through the array. When the chip is not selected, the output level always drops to a binary "0" level so that the chip is alternately selected and non-selected causing oscillation to occur which is measured in frequency counter 27. This frequency of oscillation depends on the delays of the select circuits and operation of the decode circuitry in the column, decode circuits 35, the sense amplifiers 36, 37 and the data output buffer 45. By changing the levels applied to address lines A1–A7, this selection and nonselection mode of operation is repeated for all memory cells.

In order to test the cells of the memory array as well as the addressing and enabling circuits of the array, it is necessary in all instances that the array be made to oscillate between the two binary states. This is accomplished using the output signal level from the array, and delaying it in a feedback path that includes a decoder. The decoder selects a particular input line. All other input lines are activated to predetermined levels from the external drive circuits. The output signal level is caused to change between the two binary states. Each time there is a change of state, it is measured in the frequency counter providing the indication of the frequency of oscillation and therefore the propagation times of the storage apparatus.

While this invention has been particularly described with reference to the preferred embodiments thereof, it will be understood by those skilled in the art that the foregoing and other changes in form and detail may be made therein without departing from the spirit and scope of the invention.

What is claimed is:

1. Apparatus for measuring the propagation times of information storage apparatus comprising an array of information storage cells and input accessing control circuits and output sensing circuits for said array, comprising means for storing a predetermined pattern of binary information into said cells and for applying predetermined binary signals to all but one of said control circuits so that said storage apparatus provides an output signal at said output sensing circuits, means for selectively recirculating said output signal to the remaining one of said control circuits so that the output signal from said storage apparatus oscillates, and means coupled to said output circuits for counting the oscillations from said storage apparatus, whereby an indication is provided of the propagation times.

2. The apparatus of claim 1 wherein the recirculating means comprises a feedback circuit including delay means coupled to receive said output signal and decoding means for applying said delayed output signals in inverted form to the remaining one of said input accessing control circuits.

3. The apparatus of Claim 2 wherein the counting means measures the frequency of oscillations as $f_{osc} = 1/2(t_d + t_{ckt})$ where $t_d$ is the delay of said delay means and $t_{ckt}$ is the delay of said apparatus.

4. A method of testing an array of information storage cells having input accessing control circuits and output sensing circuits, comprising
- loading a predetermined pattern of binary information into the cells of said array,
- applying predetermined binary signals to all but one of said control circuits,
- recycling the output provided from said array to the input to the remaining one of said control circuits so that said apparatus oscillates, and
- measuring the number of oscillations occurring in a predetermined period of time to obtain an indication of the delays within said apparatus.

5. Apparatus for testing an array of information storage circuits having selection, addressing, control and sensing output circuits comprising:
- a feedback path including delay means coupled to said output circuits and decoding means, said decoding means having at least one input line for accepting the output from said delay means and having a plurality of output lines for providing a feedback signal on a selected one of said plurality of output lines,
- a plurality of binary drive circuits, and
- switching means for coupling all but one of said drive circuits to corresponding ones of said select, address and control circuit and for coupling the feedback signal from said decoding means to the remaining one of said select, address and control circuits.

* * * * *